United States Patent
Conger et al.

(10) Patent No.: US 10,250,004 B2
(45) Date of Patent: Apr. 2, 2019

(54) METHOD OF FORMING A CONNECTOR FOR AN ELECTRICAL CABLE FOR ELECTRICALLY CONNECTING TO A CAMERA OF A VEHICLE

(71) Applicant: MAGNA ELECTRONICS INC., Auburn Hills, MI (US)

(72) Inventors: Jonathan D. Conger, Berkley, MI (US); Steven V. Byrne, Goodrich, MI (US); Jamie A. Mleczko, Washington, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 178 days.

(21) Appl. No.: 15/341,048

(22) Filed: Nov. 2, 2016

(65) Prior Publication Data

US 2017/0133811 A1     May 11, 2017

Related U.S. Application Data

(60) Provisional application No. 62/251,243, filed on Nov. 5, 2015.

(51) Int. Cl.
*H01R 43/00* (2006.01)
*H05K 13/00* (2006.01)
(Continued)

(52) U.S. Cl.
CPC ............ *H01R 43/24* (2013.01); *H01R 4/023* (2013.01); *H01R 4/186* (2013.01); *H01R 13/405* (2013.01);
(Continued)

(58) Field of Classification Search
CPC ...... H01R 4/023; H01R 4/186; H01R 13/405; H01R 24/28; H01R 43/005; H01R 43/02; H01R 43/04; H01R 43/24; H04N 5/2257
See application file for complete search history.

(56) References Cited

U.S. PATENT DOCUMENTS

5,204,615 A    4/1993  Richards
5,525,264 A    6/1996  Cronin et al.
(Continued)

FOREIGN PATENT DOCUMENTS

JP    2012022928 A  *  2/2012
JP    2017010713 A  *  1/2017

*Primary Examiner* — Paul D Kim
(74) *Attorney, Agent, or Firm* — Honigman LLP

(57) ABSTRACT

A method of forming an electrical cable connector for electrically connecting to a camera of a vehicle includes providing a cable, a plurality of terminals and a retaining element. The terminals are pressed into respective receiving portions and passageways of the retaining element, such that pin ends of the terminals protrude from the retaining element. Ends of the electrically conductive wires of the cable are electrically connected at wire receiving ends of the terminals. When the terminals are pressed into the retaining element and the wire ends are electrically connected at the wire receiving ends of the terminals, a wire-terminal-retainer construction is formed at the end of the cable. The wire-terminal-retainer construction is placed in a molding device and a unitary connector end is molded at and over the wire-terminal-retainer construction. The molded unitary connector end includes a connector portion and a sleeve portion.

20 Claims, 13 Drawing Sheets

(51) Int. Cl.
*H01R 43/24* (2006.01)
*H01R 4/02* (2006.01)
*H01R 24/28* (2011.01)
*H01R 4/18* (2006.01)
*H01R 13/405* (2006.01)
*H01R 43/02* (2006.01)
*H01R 43/048* (2006.01)
*H01R 107/00* (2006.01)
*H04N 5/225* (2006.01)

(52) U.S. Cl.
CPC ........... *H01R 24/28* (2013.01); *H01R 43/005* (2013.01); *H01R 43/02* (2013.01); *H01R 43/048* (2013.01); *H01R 2107/00* (2013.01); *H04N 5/2257* (2013.01)

(56) References Cited

U.S. PATENT DOCUMENTS

| | | |
|---|---|---|
| 5,550,677 A | 8/1996 | Schofield et al. |
| 5,559,556 A | 9/1996 | Kagebeck |
| 5,657,539 A | 8/1997 | Orikasa et al. |
| 5,670,935 A | 9/1997 | Schofield et al. |
| 5,821,532 A | 10/1998 | Beaman et al. |
| 5,854,708 A | 12/1998 | Komatsu et al. |
| 5,872,332 A | 2/1999 | Verma |
| 5,920,061 A | 7/1999 | Feng |
| 5,949,331 A | 9/1999 | Schofield et al. |
| 5,978,017 A | 11/1999 | Tino |
| 6,002,544 A | 12/1999 | Yatsu |
| 6,013,372 A | 1/2000 | Hayakawa et al. |
| 6,071,606 A | 6/2000 | Yamazaki et al. |
| 6,072,814 A | 6/2000 | Ryan et al. |
| 6,117,193 A | 9/2000 | Glenn |
| 6,151,065 A | 11/2000 | Steed |
| 6,178,034 B1 | 1/2001 | Allemand et al. |
| 6,193,378 B1 | 2/2001 | Tonar et al. |
| 6,222,447 B1 | 4/2001 | Schofield et al. |
| 6,259,475 B1 | 7/2001 | Ramachandran et al. |
| 6,292,311 B1 | 9/2001 | Bohn et al. |
| 6,481,003 B1 | 11/2002 | Maeda |
| 6,483,101 B1 | 11/2002 | Webster |
| 6,535,242 B1 | 3/2003 | Strumolo et al. |
| 6,559,439 B1 | 5/2003 | Tsuchida et al. |
| 6,590,658 B2 | 7/2003 | Case et al. |
| 6,603,612 B2 | 8/2003 | Nakano |
| 6,651,187 B2 | 11/2003 | Lacey, III |
| 6,654,187 B2 | 11/2003 | Ning |
| 6,805,767 B2 | 10/2004 | Shinomiya |
| 6,897,432 B2 | 5/2005 | Schmidtke et al. |
| 7,015,944 B2 | 3/2006 | Holz et al. |
| 7,031,075 B2 | 4/2006 | Tsuji |
| 7,095,123 B2 | 8/2006 | Prior |
| 7,095,572 B2 | 8/2006 | Lee et al. |
| 7,097,469 B2* | 8/2006 | Jacobs ............... H01R 13/11 439/246 |
| 7,215,479 B1 | 5/2007 | Bakin |
| 7,268,957 B2 | 9/2007 | Frenzel et al. |
| 7,289,037 B2 | 10/2007 | Uken et al. |
| 7,391,458 B2 | 6/2008 | Sakamoto |
| 7,419,315 B2 | 9/2008 | Hirata et al. |
| 7,423,665 B2 | 9/2008 | Ray et al. |
| 7,453,509 B2 | 11/2008 | Losehand et al. |
| 7,480,149 B2 | 1/2009 | DeWard et al. |
| 7,536,316 B2 | 5/2009 | Ozer et al. |
| 7,599,134 B2 | 10/2009 | Bechtel et al. |
| 7,665,915 B2 | 2/2010 | Lee |
| 7,697,056 B2 | 4/2010 | Huang |
| 7,768,574 B2 | 8/2010 | Humpston |
| 7,965,336 B2 | 6/2011 | Bingle et al. |
| 8,120,652 B2 | 2/2012 | Bechtel et al. |
| 8,256,821 B2 | 9/2012 | Lawlor et al. |
| 8,318,512 B2 | 11/2012 | Shah et al. |
| 8,356,950 B2* | 1/2013 | Sato .................. G03B 3/10 396/529 |
| 8,482,664 B2 | 7/2013 | Byrne et al. |
| 8,506,185 B2* | 8/2013 | Sato .................. G03B 3/10 396/529 |
| 8,542,451 B2 | 9/2013 | Lu et al. |
| 8,570,374 B2 | 10/2013 | Betham et al. |
| 8,790,121 B2* | 7/2014 | Hirakawa ........... H01R 12/721 439/582 |
| 8,866,012 B2* | 10/2014 | Engelbach ........... G01D 11/245 174/50 |
| 8,866,907 B2 | 10/2014 | McElroy et al. |
| 8,994,878 B2 | 3/2015 | Byrne et al. |
| 9,210,307 B2 | 12/2015 | Gebauer et al. |
| 9,233,641 B2 | 1/2016 | Sesti et al. |
| 9,277,104 B2 | 3/2016 | Sesti et al. |
| 9,338,334 B2 | 5/2016 | Lu et al. |
| 9,365,160 B2 | 6/2016 | Byrne et al. |
| 9,451,138 B2 | 9/2016 | Winden et al. |
| 9,487,159 B2 | 11/2016 | Achenbach |
| 9,565,342 B2 | 2/2017 | Sauer et al. |
| 9,596,387 B2 | 3/2017 | Achenbach et al. |
| 9,621,769 B2 | 4/2017 | Mai et al. |
| 9,986,136 B2 | 5/2018 | Newiger |
| 9,992,392 B2 | 6/2018 | Byrne et al. |
| 2002/0167605 A1 | 11/2002 | Akimoto et al. |
| 2002/0175832 A1 | 11/2002 | Mizusawa |
| 2003/0090569 A1 | 5/2003 | Poechmueller |
| 2003/0137595 A1 | 7/2003 | Takachi |
| 2005/0104995 A1 | 5/2005 | Spryshak et al. |
| 2005/0141106 A1 | 6/2005 | Lee et al. |
| 2005/0190283 A1 | 9/2005 | Ish-Shalom et al. |
| 2005/0274883 A1 | 12/2005 | Nagano |
| 2006/0049533 A1 | 3/2006 | Kamoshita |
| 2006/0050018 A1 | 3/2006 | Hutzel et al. |
| 2006/0054802 A1 | 3/2006 | Johnston |
| 2006/0056077 A1 | 3/2006 | Johnston |
| 2006/0061008 A1 | 3/2006 | Kamer et al. |
| 2006/0065436 A1 | 3/2006 | Gally et al. |
| 2006/0077575 A1 | 4/2006 | Nakai et al. |
| 2006/0103727 A1 | 5/2006 | Tseng |
| 2006/0125919 A1 | 6/2006 | Camilleri et al. |
| 2006/0171704 A1 | 8/2006 | Bingle et al. |
| 2006/0184297 A1 | 8/2006 | Higgins-Luthman |
| 2007/0040034 A1 | 2/2007 | Hennick |
| 2007/0096020 A1 | 5/2007 | Mitsugi et al. |
| 2007/0279518 A1 | 12/2007 | Apel et al. |
| 2008/0024883 A1 | 1/2008 | Iwasaki |
| 2008/0043105 A1 | 2/2008 | Kallhammer et al. |
| 2008/0122965 A1 | 5/2008 | Fang |
| 2009/0010494 A1 | 1/2009 | Bechtel et al. |
| 2009/0012203 A1 | 1/2009 | Nakanishi et al. |
| 2009/0244361 A1 | 10/2009 | Gebauer et al. |
| 2009/0295181 A1 | 12/2009 | Lawlor et al. |
| 2010/0015713 A1 | 1/2010 | Deeter et al. |
| 2010/0097519 A1 | 4/2010 | Byrne et al. |
| 2010/0103308 A1 | 4/2010 | Butterfield et al. |
| 2010/0216356 A1* | 8/2010 | Takehara ............ H01R 4/5033 439/863 |
| 2010/0279439 A1 | 11/2010 | Shah et al. |
| 2011/0025850 A1 | 2/2011 | Maekawa et al. |
| 2011/0070770 A1* | 3/2011 | Sakai .................... H01R 4/70 439/521 |
| 2011/0104929 A1* | 5/2011 | Suzuki ................ H01R 4/5033 439/345 |
| 2011/0298968 A1 | 12/2011 | Tseng et al. |
| 2012/0081550 A1 | 4/2012 | Sewell |
| 2012/0265416 A1 | 10/2012 | Lu |
| 2013/0242099 A1 | 9/2013 | Sauer et al. |
| 2014/0000804 A1 | 1/2014 | Looi et al. |
| 2014/0022657 A1 | 1/2014 | Lu et al. |
| 2014/0313337 A1 | 10/2014 | Devota et al. |
| 2014/0373345 A1 | 12/2014 | Steigerwald |
| 2015/0124098 A1 | 5/2015 | Winden et al. |
| 2015/0222795 A1 | 8/2015 | Sauer et al. |
| 2015/0266430 A1 | 9/2015 | Mleczko et al. |
| 2015/0327398 A1 | 11/2015 | Achenbach et al. |
| 2015/0365569 A1 | 12/2015 | Mai et al. |
| 2016/0037028 A1 | 2/2016 | Biemer |
| 2016/0255257 A1 | 9/2016 | Lu et al. |
| 2016/0268716 A1 | 9/2016 | Conger et al. |

(56) References Cited

U.S. PATENT DOCUMENTS

| | | |
|---|---|---|
| 2017/0054881 A1 | 2/2017 | Conger et al. |
| 2017/0129419 A1 | 5/2017 | Conger et al. |
| 2017/0201661 A1 | 7/2017 | Conger |
| 2017/0295306 A1 | 10/2017 | Mleczko |
| 2017/0302829 A1 | 10/2017 | Mleczko et al. |
| 2018/0072239 A1 | 3/2018 | Wienecke et al. |
| 2018/0098033 A1 | 4/2018 | Mleczko et al. |

\* cited by examiner

Dielectric positioning block

Example Terminal Pin – Solder Type

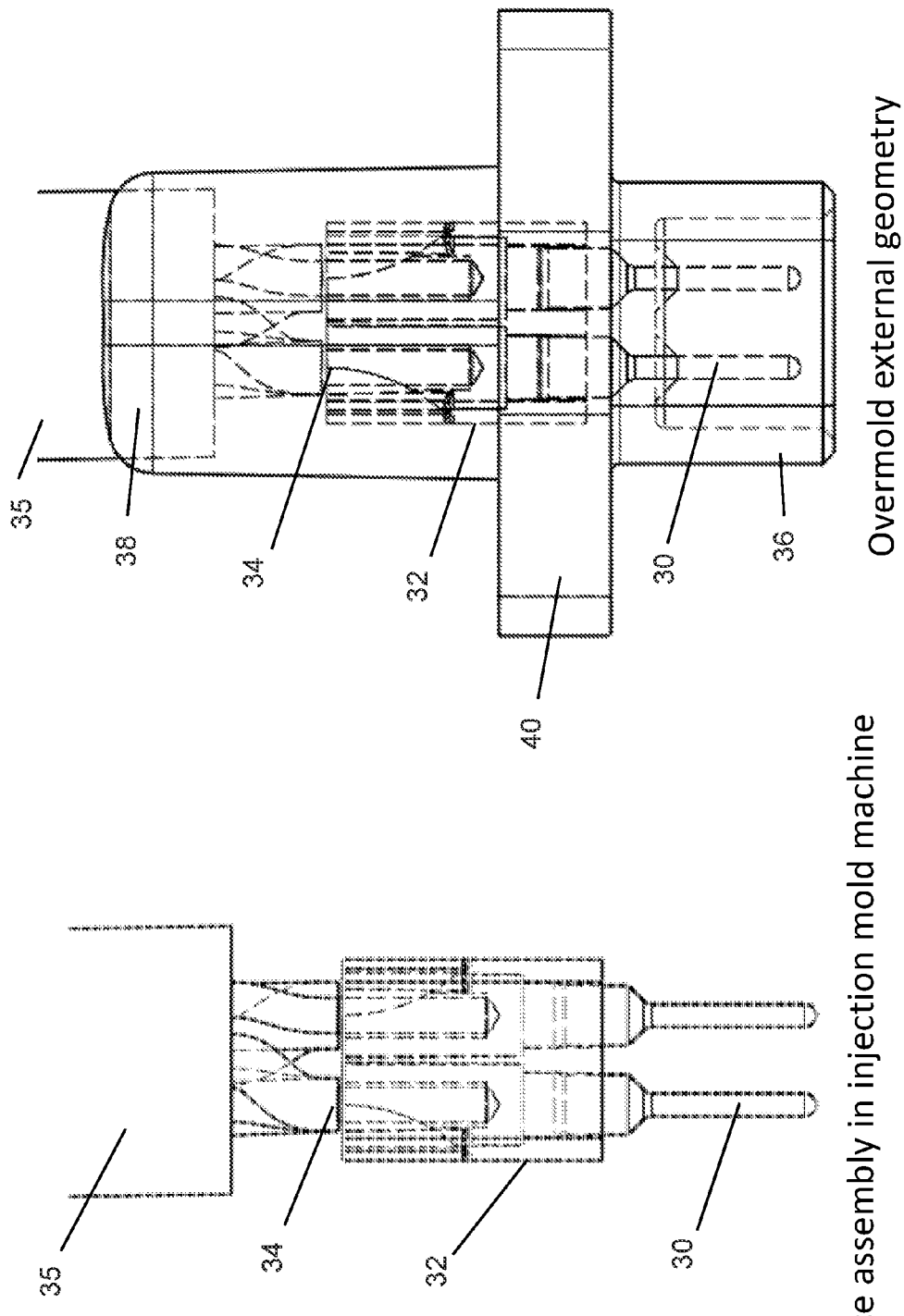

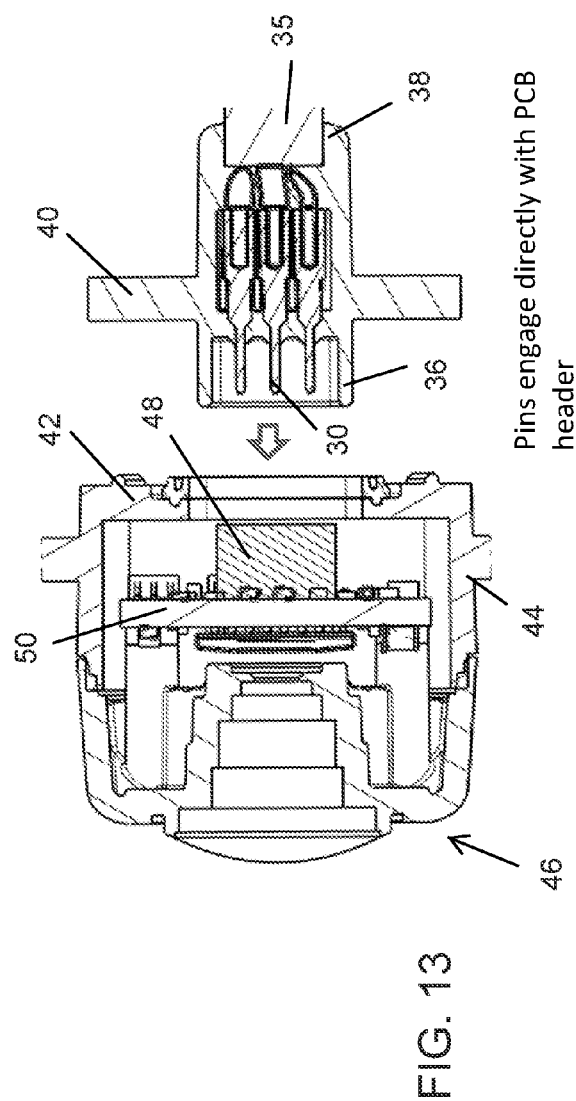
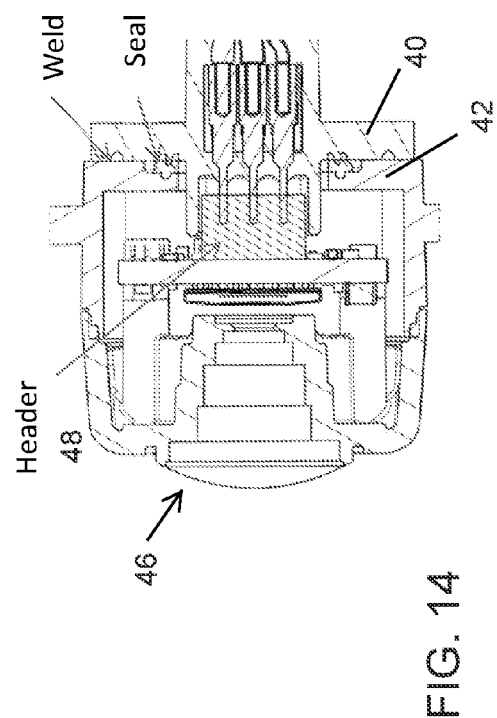
FIG. 13
FIG. 14

Press pins into block

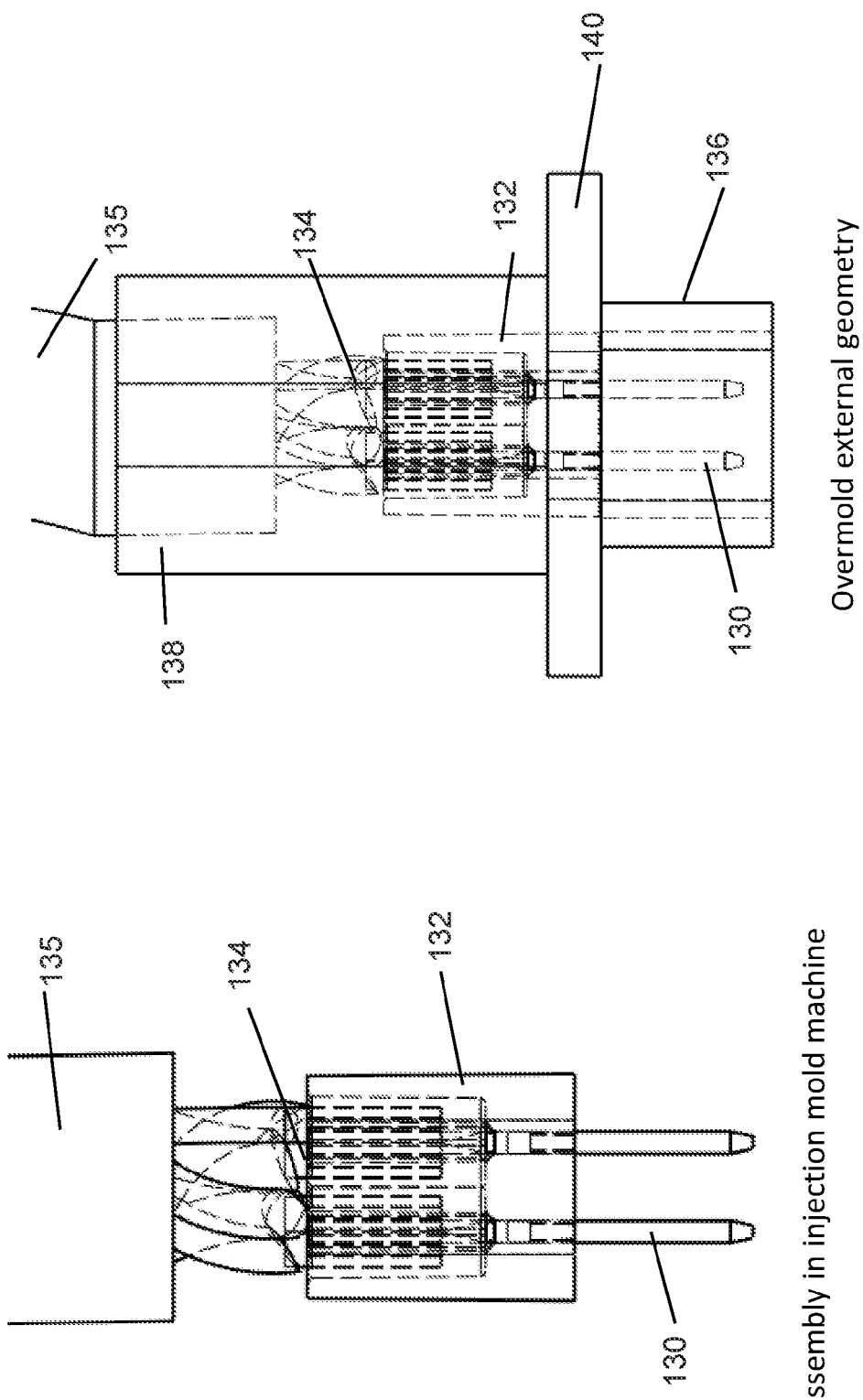

METHOD OF FORMING A CONNECTOR FOR AN ELECTRICAL CABLE FOR ELECTRICALLY CONNECTING TO A CAMERA OF A VEHICLE

CROSS REFERENCE TO RELATED APPLICATION

The present application claims the filing benefits of U.S. provisional application Ser. No. 62/251,243 filed Nov. 5, 2015, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties. Various cameras are known, such as described in U.S. Pat. Nos. 7,965,336 and/or 8,542,451, which are hereby incorporated herein by reference in their entireties.

SUMMARY OF THE INVENTION

The present invention provides an electrical connector for a camera assembly configured for mounting at a vehicle as part of a vehicle vision system. The electrical connector comprises a multi-pin connecting end that has the external geometries of the connector overmolded over the pins and retaining element (that retain and hold and space apart the pins or terminals). The overmolded geometries include a connecting portion or socket that may connect to or receive a corresponding connector whereby the terminals or pins of the overmolded connector engage and electrically connect with terminals or receivers at the corresponding connector. The overmolded geometries include a sleeve portion that may bond to the jacket or outer covering of the wire or cable that includes the multiple wires electrically connected to the multiple pins or terminals. The overmolded geometries may include a connecting plate that is configured to connect to a camera or bracket or the like, whereby, when connected (such as via welding or fasteners), the connecting portion and terminals may protrude through an attachment plate of the camera or bracket to connect to terminals of a connector of the camera.

These and other objects, advantages, purposes and features of the present invention will become apparent upon review of the following specification in conjunction with the drawings.

BRIEF DESCRIPTION OF THE DRAWINGS

FIG. 8 is a side elevation of the wires and pins and positioning box of the connector, suitable for the overmolding process of the present invention;

FIG. 9 is a side elevation of the wires and pins and positioning box of FIG. 8, shown with the connector portion overmolded in accordance with the present invention;

FIGS. 13 and 14 are sectional views showing the connector connecting to the camera and bracket assembly of FIG. 12;

FIG. 23 is a side elevation of the wires and pins and positioning box of the connector, suitable for the overmolding process of the present invention; and FIG. 24 is a side elevation of the wires and pins and positioning box of FIG. 22, shown with the connector portion overmolded in accordance with the present invention.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
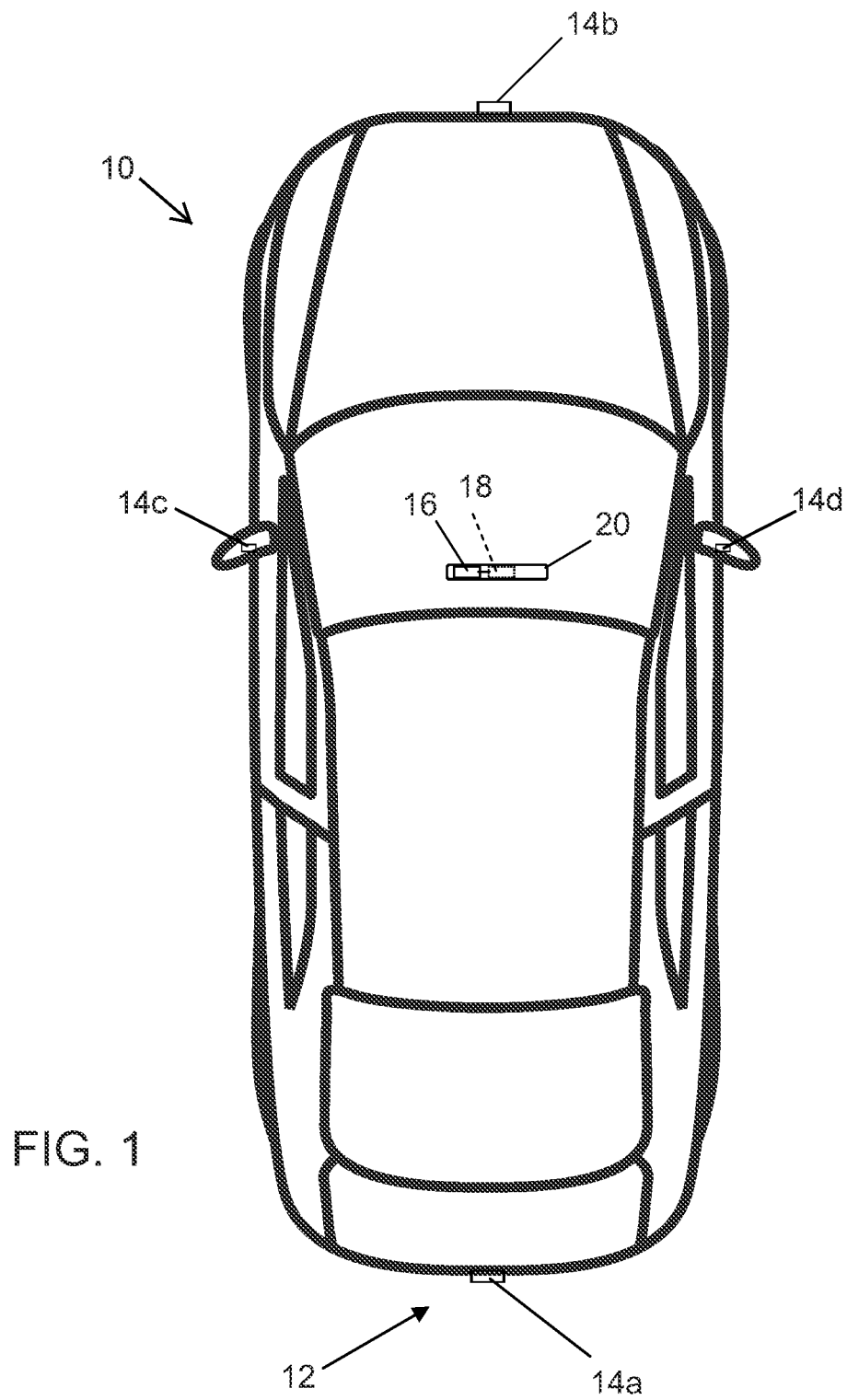
FIG. 1 is a plan view of a vehicle with a vision system that incorporates cameras in accordance with the present invention.
Figure 3:
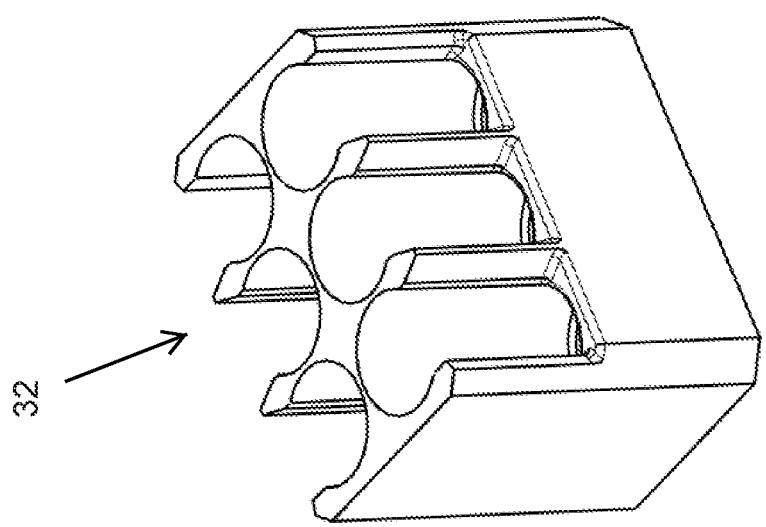
FIGS. 2 and 3 are perspective views of a dielectric positioning box or element for the overmolded connector assembly of the present invention.
Figure 2:
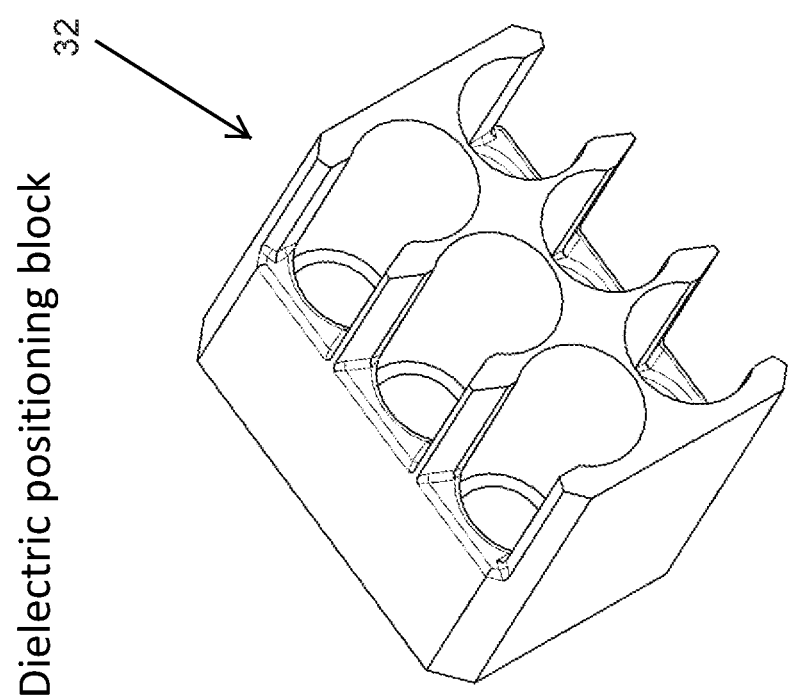

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

In a camera module it is often advantageous to provide an electrical harness as part of the assembly. Typically these harnesses include female receptacle pins which engage with male pins in the housing, which are then connected to the PCB by a pin-and-header connection or a spring connection.

The present invention provides a harness construction that integrates pins into the harness side, which is meant to engage directly with a common surface mount header on the PCB of the camera. Two examples of the construction are provided: one with soldered terminals (FIGS. 2-9), and the other with crimped pins and wires (FIGS. 15-24), but any known method to attach a wire to a terminal is acceptable. The pins are pressed into a dielectric or non-electrically conducting terminal block that provides electrical isolation between the terminals, and positions the terminals in the ideal position relative to each other to minimize the overall size of the connector.

Figure 4:
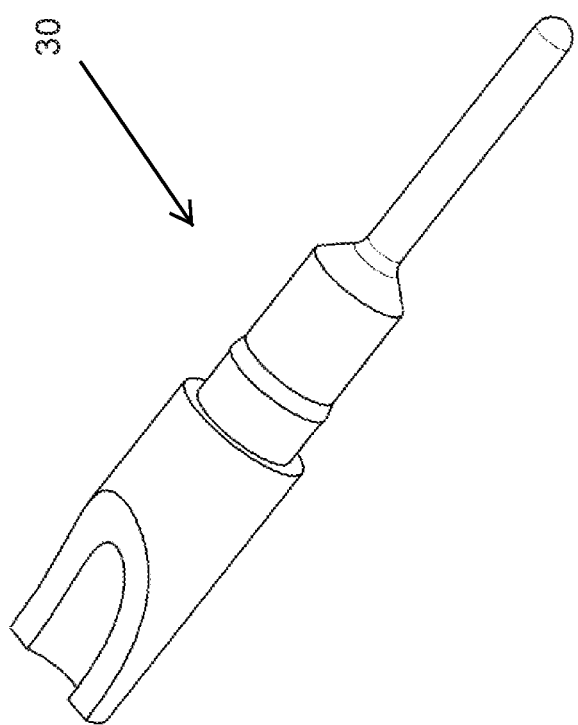
FIG. 4 is a perspective view of a terminal pin suitable for use in the overmolded connector assembly of the present invention.
Figure 7:
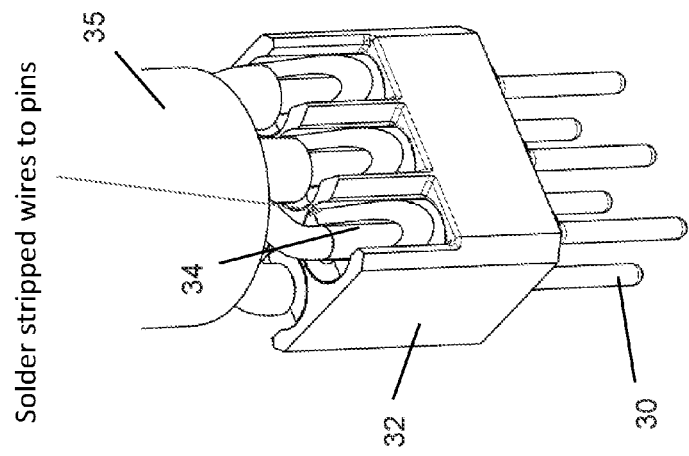
FIG. 7 is a perspective view showing a plurality of stripped wires received at and soldered at the pins of FIG. 6.
Figure 6:
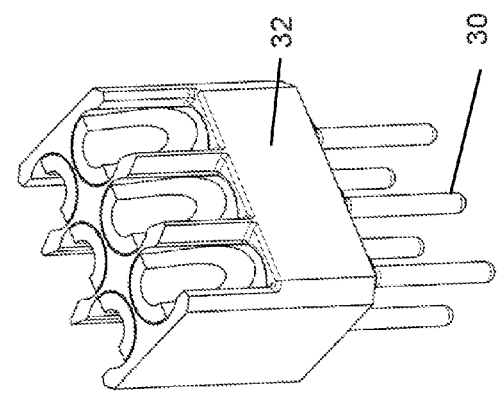
FIG. 6 is a perspective view showing the pins pressed into the positioning box.
Figure 5:
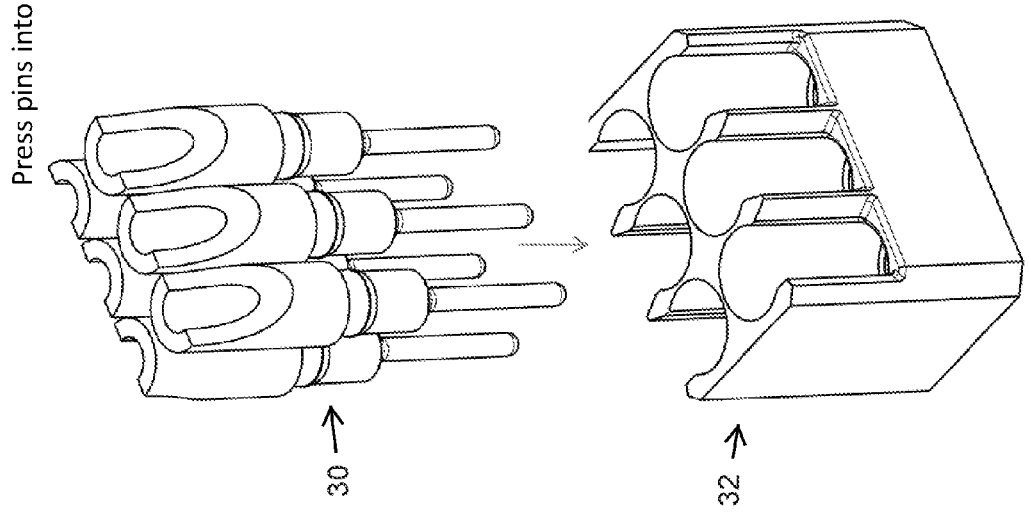
FIG. 5 is an exploded perspective view showing a plurality of pins of FIG. 4 being pressed into a positioning box of FIGS. 2 and 3.

In the illustrated embodiment of FIGS. 2-9, the pins 30 are pressed into a dielectric positioning box or terminal block 32, which receives the pins in respective receiving portions and passageways such that the pins are pressed into the respective receiving portions and passageways with the terminal ends of the pins protruding from the terminal block and with the wire receiving portion or back ends of the pins being disposed at and received in respective receiving portions at the rear of the terminal block (see FIGS. 5 and 6). For example, and such as shown in FIG. 4, the pins or terminals 30 have a narrowed end or pin end that passes through the passageways and protrudes therefrom, and a wider portion that is snugly pressed into and engages the walls of the receiving portions, with a wider receiving end that is configured to receive the stripped ends of the wires therein, whereby the wires are soldered at the respective pins. The walls of the terminal block 32 electrically isolate the terminals or pins 30 and wires to limit or preclude electrical shorting. As shown in FIG. 7, the stripped wires 34 (of a multi-wire cable 35) may be soldered at the exposed or accessible rear end portions of the pins at the terminal block. Optionally, the steps may be reversed and the wires may be soldered to the pins before the pins are pressed into the terminal block.

Figure 11:
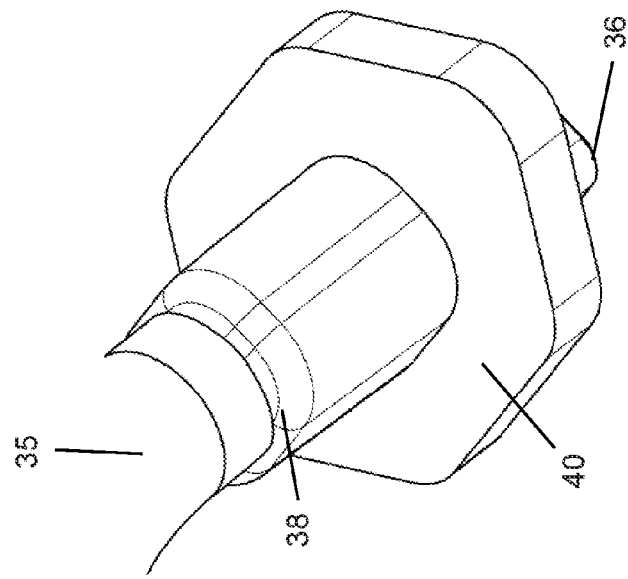
FIGS. 10 and 11 are perspective views of the overmolded connector end portion of the electrical connector of the present invention.
Figure 10:
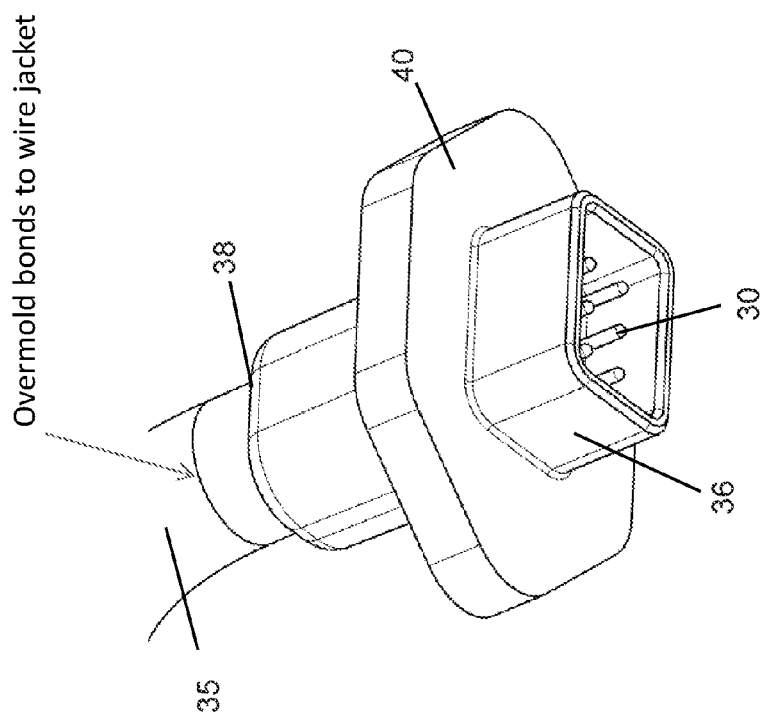

After the pins and terminal block and wire assembly is constructed, the assembly (see FIG. 8) may be placed in an injection molding machine, whereby the external geometries of the connector end of the connector are molded over the pin-block-wire assembly (see FIG. 9). As shown in FIGS. 9-11, the external overmolded geometries may include a connector portion 36, such as a socket that partially surrounds the pins for snapping to or receiving a connector or SMT header or the like at the circuit element or printed circuit board (PCB) of the camera. The connecting portion or box guides the pins to the receptacle and protects them from damage. The terminal block holds and guides the pins and the socket surrounds the exposed or protruding portions of the pins to protect the pins and position the pins at the right locations for engaging corresponding receiving portions of another electrical connector, such as at a camera or the like. The external overmolded geometries also include a sleeve portion 38 to protect the wires at the connection to the pins and to seal the wire or cable and limit water intrusion into the connector. The overmolded sleeve portion bonds to the wire jacket or sleeve of the multi-wire cable or harness.

In the illustrated embodiment, the external overmolded geometries also include a connecting plate 40 that is configured to connect to an attachment plate or portion of a camera and/or bracket assembly. The plate or surface may be used for seal bearing or to integrate a seal at the interface with the camera. Optionally, the plate or surface may include features to fasten or weld to the mating part (such as a camera or bracket or the like). For example, the plate or surface may include through holes or features to fasten or weld the connecting plate to the mating part or attachment plate.

Figure 12:
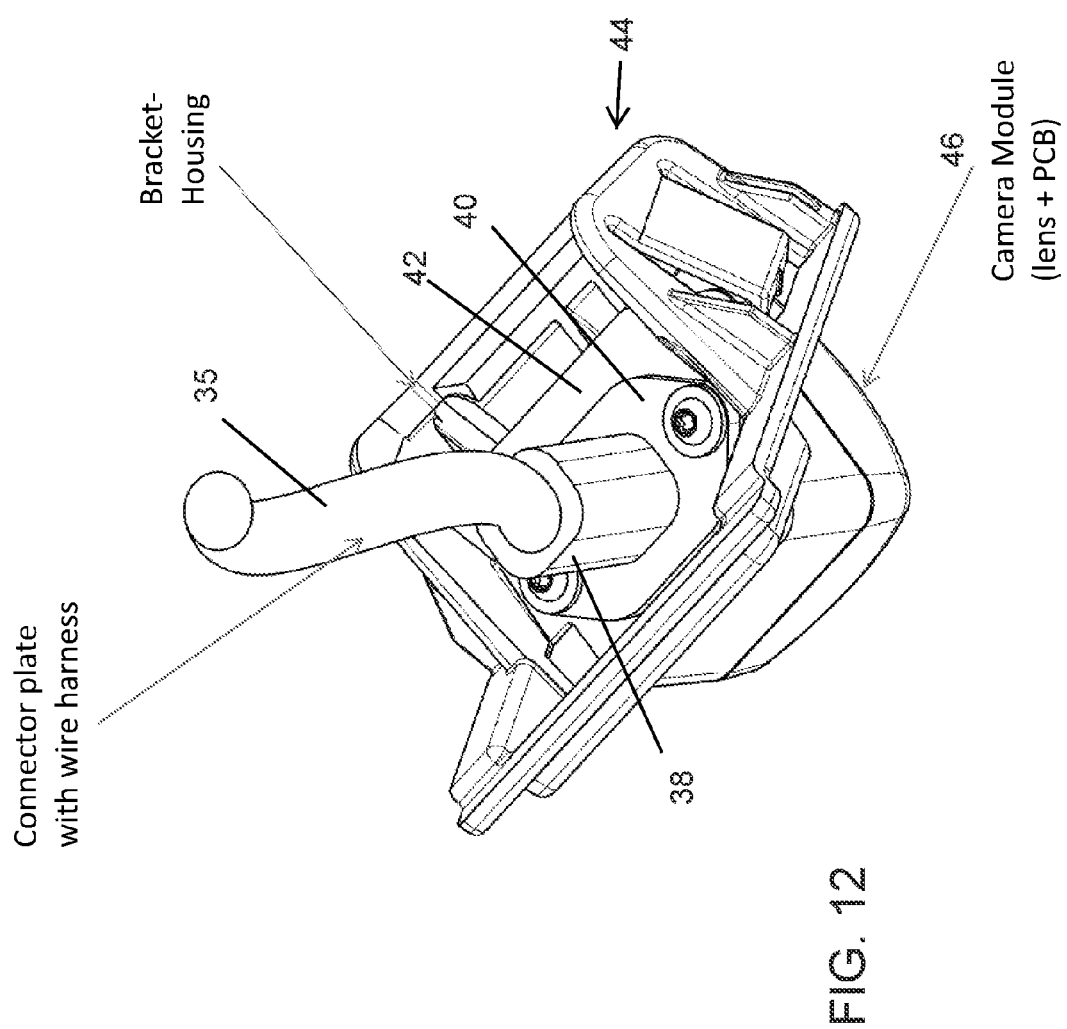
FIG. 12 is a perspective view of a camera and bracket assembly, shown with the overmolded connecting plate of the electrical connector attaching at an attachment plate of the bracket to electrically connect the connector with circuitry of the camera.

The overmolded attachment plate or connecting plate may be formed in any suitable shape, depending on the particular application of the connector and wire or cable. Optionally, for example, and such as shown in FIGS. 12-14, the connecting plate 40 may connect to an attachment plate 42 of a bracket 44, which also connects to or attaches at a camera module or unit 46, such as by utilizing aspects of the camera and bracket assemblies described in U.S. patent application Ser. No. 15/341,047, filed on Nov. 2, 2016 by Conger et al. for VEHICLE CAMERA WITH MODULAR CONSTRUCTION, which published on May 11, 2017 as U.S. Patent Publication No. US-2017-0129419, which is hereby incorporated herein by reference in its entirety (and such as being welded at the bracket attachment plate or fastened thereat, with a seal disposed between the connecting plate and attachment plate to seal the connector at the camera and bracket assembly). In such an application, the connecting plate 40 is formed to attach (such as by welding or fasteners or the like) at the attachment plate 42 of the bracket 44, while the connector portion or socket 36 and the ends of the pins protrude through an aperture or hole in the attachment plate and electrically connect to a header 48 at the PCB 50 of the camera unit 46. The construction allows for various bracket-housings and connector plates to be interchanged for different applications.

Thus, the present invention provides an electrical connector that is overmolded over a plurality of wires, in order to seal the wires and to provide the desired shape or form of a connecting end of the connector for the particular application of the electrical connector or wire or cable. The wires and terminals are retained and electrically isolated from one another via a terminal block or box or element that positions the terminals at appropriate locations for electrically connecting to terminals or receives of another electrical connector, such as an SMT header of a PCB of a camera or the like. The overmolded connector provides electrical insulation, environmental protection and wire retention between the cable and the connecting block or terminal block.

Figure 15:
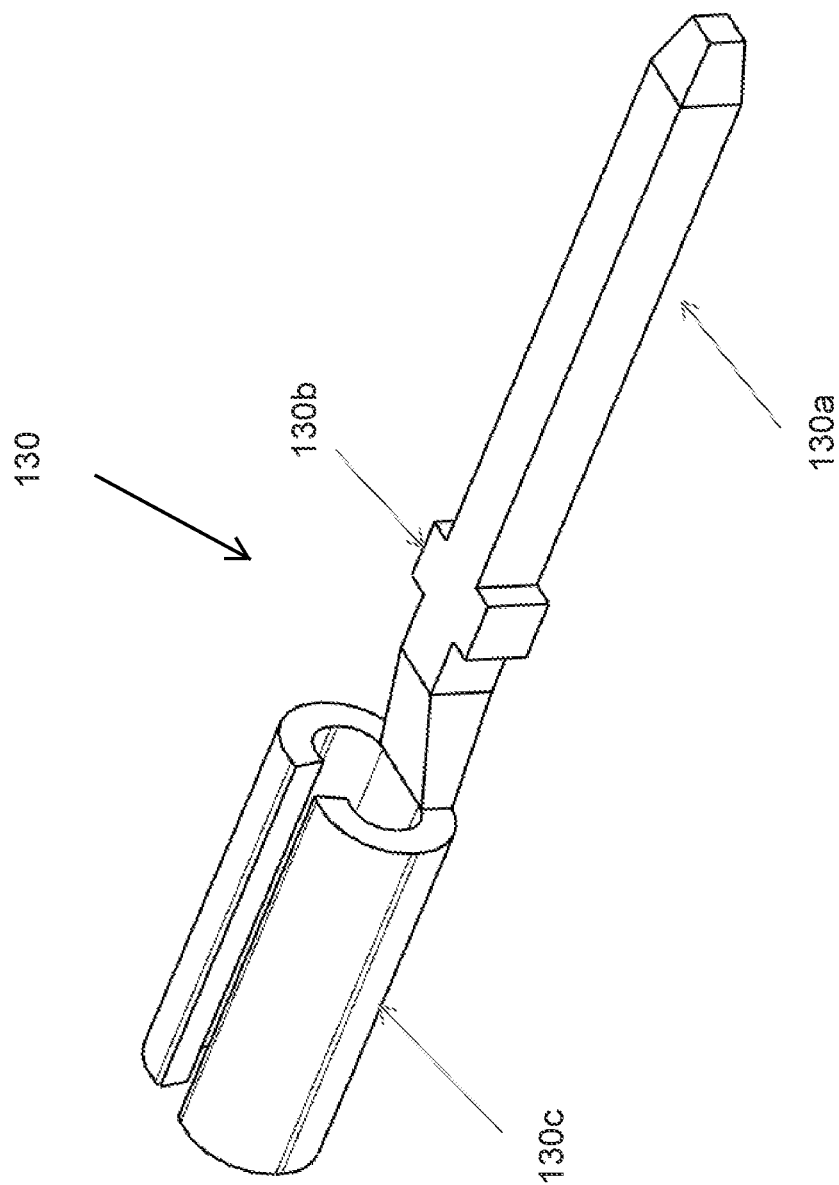
FIG. 15 is a perspective view of a crimp-type terminal pin suitable for use in the overmolded connector assembly of the present invention.
Figure 16:
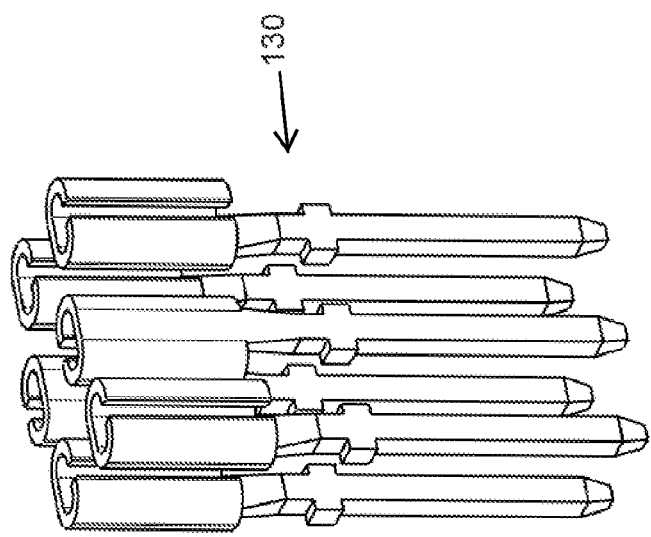
FIG. 16 is a perspective view of a plurality of crimp-type terminal pins of FIG. 15.
Figure 17:
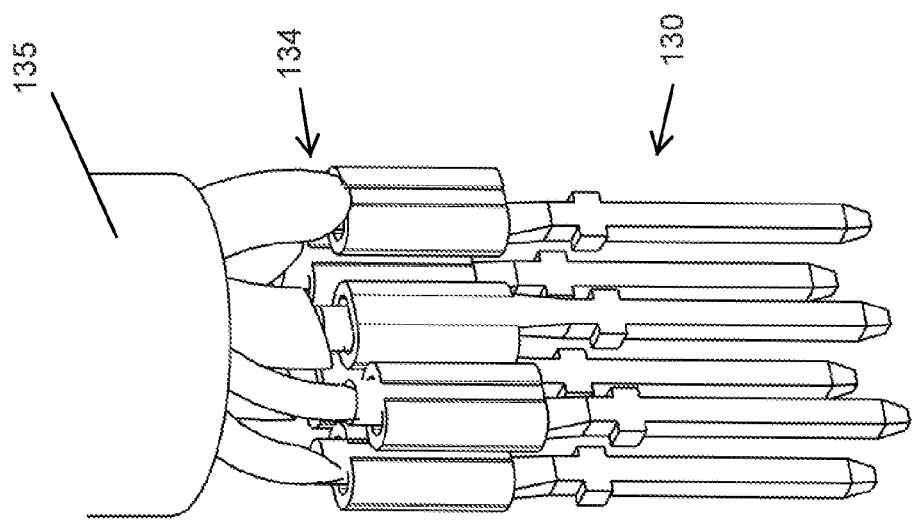
FIG. 17 is a perspective view of the crimp-type terminal pins of FIG. 16, with a plurality of stripped wires crimped at respective pins.
Figure 19:
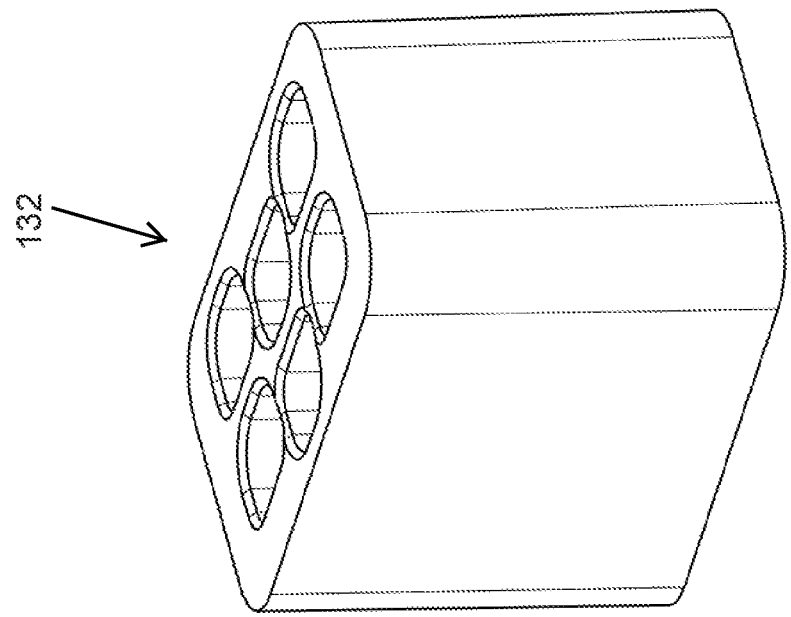
FIGS. 18 and 19 are perspective views of a dielectric positioning box or element for the overmolded connector assembly of the present invention using crimp-type pins.
Figure 18:
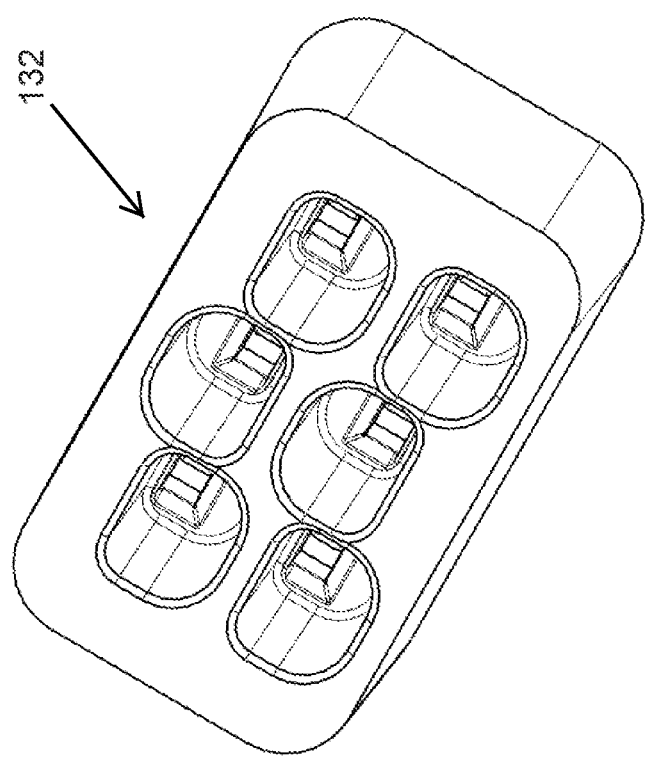
Figure 21:
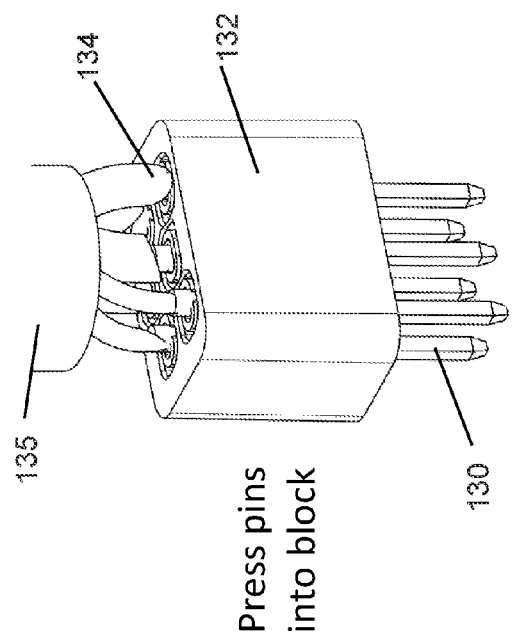
FIG. 21 is a perspective view showing the pins pressed into the positioning box.
Figure 22:
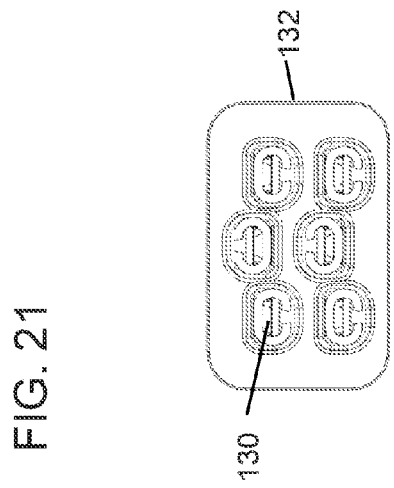
FIG. 22 is a plan view showing the pins pressed into the positioning box.
Figure 20:
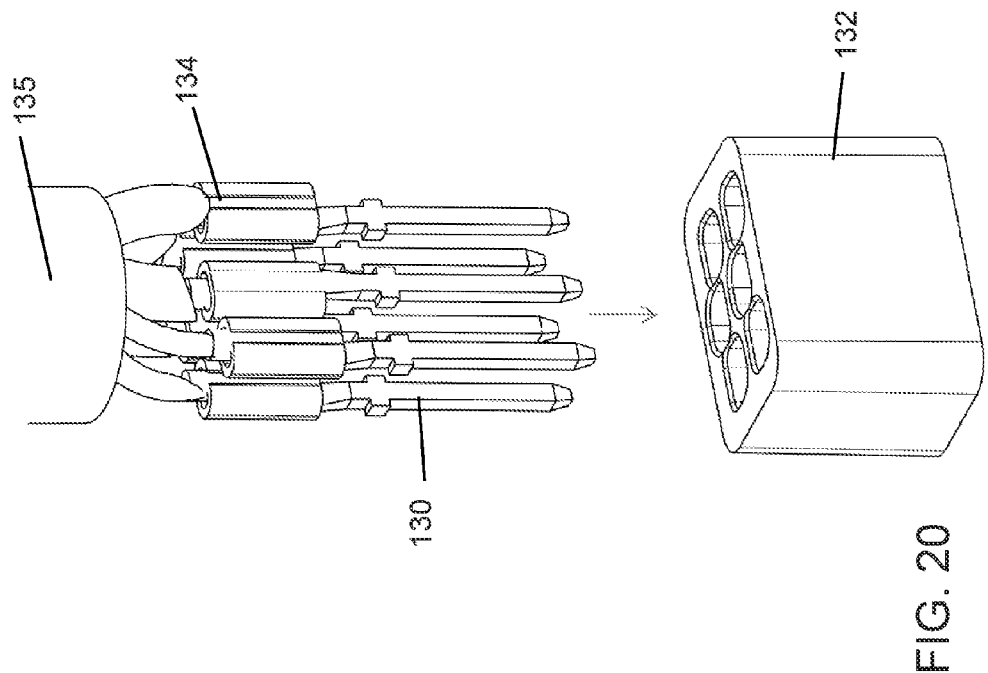
FIG. 20 is an exploded perspective view showing the pins of FIG. 17 being pressed into a positioning box of FIGS. 18 and 19.

The pins and wires may comprise any suitable wires or terminals. For example, and such as shown in FIGS. 2-9, the wires may be received at the back ends of the terminals and soldered therein (either before or after the terminals are pressed into the dielectric box or element). Optionally, and such as shown in FIGS. 15-24, the pins 130 may comprise crimp-type pins, whereby the stripped ends of the wires 134 (of a multi-wire cable 135) are received in a stamped receiving portion of the pins and the receiving portion is crimped tightly onto and at least partially around the stripped wire end. The pins 130 are pressed into a dielectric positioning box or terminal block or retaining element 132, which receives the pins in respective passageways such that the pins are pressed into the passageways with the terminal ends of the pins protruding from the terminal block and with the wire receiving portion or back ends of the pins being disposed at the rear of the terminal block (see FIGS. 20-22). For example, and such as shown in FIG. 15, the pins or terminals have a narrowed end 130a (such as round or square or rectangular or any suitable shape) that passes through a correspondingly formed passageways and protrudes therefrom, and may have an orientation and location assurance feature or expanded portion 130b that is received in a wider portion of the passageway to position the pin at the appropriate depth at the terminal block or element. The material may be stamped thinner at the crimping portion 130c to ease crimping to reduce the size. A wider portion of the passageways of the terminal block receive or partially receive the crimping portions 130c of the pins to further retain the pins at the dielectric terminal block (see FIG. 18). The walls of the terminal block 132 electrically isolate the pins 130 and wires to limit or preclude electrical shorting.

After the pin and terminal block and wire assembly is constructed, the assembly (see FIGS. 21-23) may be placed in an injection molding machine, whereby the external geometries of the connector end of the connector are molded over the pin-block-wire assembly (see FIG. 24). As shown in FIG. 24, and similar to the connector described above, the external overmolded geometries may include a connector portion 136, such as a socket that partially surrounds the pins for snapping to or receiving a connector or SMT header or the like at the circuit element or printed circuit board (PCB) of the camera, a sleeve portion 138 to protect the wires at the connection to the pins and to seal the wire or cable and limit water intrusion into the connector, and a connecting plate 140 that is configured to connect to an attachment plate or portion of a camera and/or bracket assembly. The connector and overmolded geometries may be similar to the connector and overmolded geometries discussed above, such that the details need not be repeated herein. As discussed above, the overmolded attachment plate or connecting plate may be formed in any suitable shape, depending on the particular application of the connector and wire or cable, and the connecting plate may connect to an attachment plate of a bracket, which also connects to or attaches at a camera module or unit, such as by utilizing aspects of the camera and bracket assemblies described in U.S. patent application Ser. No. 15/341,047, filed on Nov. 2, 2016 by Conger et al. for VEHICLE CAMERA WITH MODULAR CONSTRUCTION, which published on May 11, 2017 as U.S. Patent Publication No. US-2017-0129419, which is hereby incorporated herein by reference in its entirety.

Therefore, the present invention provides an overmolded connector end for an electrical connector or cable, with the overmolded connector end providing a socket (or plug depending on the particular application) at the terminals or pins of the connector or cable and a connecting portion or flange or plate for mechanically (such as via welding or fastening or the like) the connector end at an accessory, such as a camera or camera bracket or the like. The overmolded connector end is unitarily molded over the terminals and an alignment element or box and a portion of the cable so as to provide the mounting feature and connecting feature as one part, along with sealing at or bonding at the outer sleeve or portion of the cable.

The method of forming the overmolded connector end comprises providing a plurality of pins and a cable having a plurality of wires (such as with stripped ends of the wires). The pins are pressed into a guiding or retaining box or block or element and the wires are electrically connected at the pins (such as via solder or crimping). The wires may be attached or soldered to the pins before or after the pins are pressed into the terminal block or retaining element. The wires-pins-block construction is then placed in a mold cavity or device that molds (such as via injection molding) a unitary connector end of the retaining element and a portion of the cable and a portion of the terminal or pin ends, while maintaining the pin ends exposed at or in a connecting end portion or socket portion of the overmolded connector end. The overmolded connector end also includes an attaching flange or portion or plate for attaching or connecting the cable at the desired accessory, such as at an attachment plate of a camera or camera mounting bracket or the like. The overmolded connector also includes a sleeve portion that at least partially overlaps an outer cover of the cable and seals or bonds at the outer cover to seal the overmolded connector end at the cable.

The camera thus may include electrical connecting elements that accommodate tolerances in the housing and/or PCB mounting and/or connector portion. The electrical connecting elements may utilize aspects of the cameras and electrical connectors described in U.S. Pat. No. 9,233,641 and/or U.S. Publication Nos. US-2013-0242099; US-2014-0373345; US-2015-0222795; US-2015-0266430; US-2015-0365569; US-2016-0037028 and/or US-2016-0268716, and/or U.S. provisional applications, Ser. No. 62/313,278, filed Mar. 25, 2016, Ser. No. 62/319,953, filed Apr. 8, 2016, and/or Ser. No. 62/322,334, filed Apr. 14, 2016, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 8,694,224; 7,005,974; 5,760,962; 5,877,897; 5,796,094; 5,949,331; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 7,881,496; 7,720,580; 7,038,577; 6,882,287; 5,929,786 and/or 5,786,772, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Publication No. US-2012-0062743, which are hereby incorporated herein by reference in their entireties.

The imaging device and control and image processor and any associated illumination source, if applicable, may comprise any suitable components, and may utilize aspects of the cameras (such as various imaging sensors or imaging array sensors or cameras or the like, such as a CMOS imaging array sensor, a CCD sensor or other sensors or the like) and vision systems described in U.S. Pat. Nos. 5,760,962; 5,715,093; 6,922,292; 6,757,109; 6,717,610; 6,590,719; 6,201,642; 5,796,094; 6,559,435; 6,831,261; 6,822,563; 6,946,978; 7,720,580; 8,542,451; 7,965,336; 7,480,149; 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2009/036176; WO 2009/046268; WO 2010/099416; WO 2011/028686 and/or WO 2013/016409, and/or U.S. Pat. Publication Nos. US 2010-0020170 and/or US-2009-0244361, which are all hereby incorporated herein by reference in their entireties.

Optionally, the vision system may include a display for displaying images captured by one or more of the imaging sensors for viewing by the driver of the vehicle while the driver is normally operating the vehicle. Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method of forming a connector for an electrical cable for electrically connecting to a camera of a vehicle, said method comprising:

providing a cable having a plurality of electrically conductive wires, wherein each of said wires is electrically insulated from the others of said wires, and wherein said wires are within an outer sleeve of said cable;

stripping said outer sleeve of said cable and stripping electrically insulating material from ends of said wires to provide exposed ends of said electrically conductive wires;

providing a plurality of terminals each having a wire receiving end and a pin end opposite said wire receiving end;

providing a non-electrically conductive retaining element having a plurality of receiving portions and passageways separated by respective walls of said retaining element;

pressing said terminals into respective ones of said receiving portions and passageways of said retaining element, wherein walls of said retaining element electrically isolate said terminals from one another, and wherein said pin ends of said terminals pass through said passageways and protrude from said retaining element when said terminals are pressed into respective ones of said receiving portions and passageways of said retaining element;

electrically connecting the exposed ends of said electrically conductive wires at said wire receiving ends of said terminals, wherein, when said terminals are pressed into respective ones of said receiving portions and passageways of said retaining element and the exposed ends of said electrically conductive wires are electrically connected at said wire receiving ends of said terminals, a wire-terminal-retainer construction is formed at the end of the cable; and placing said wire-terminal-retainer construction in a molding device and molding a non-electrically conductive plastic resin to form a unitary connector end at and over said wire-terminal-retainer construction, wherein said molded unitary connector end comprises (i) a connector portion that is at and partially around exposed portions of said pin ends of said terminals that protrude from said retaining element, (ii) an attaching structure for attaching the cable at the camera, and (iii) a sleeve portion that at least partially overlaps said outer sleeve of said cable and seals or bonds at said outer sleeve to seal the molded unitary connector end at said cable.

2. The method of claim 1, wherein said exposed ends of said electrically conductive wires are electrically connected at said wire receiving ends of said terminals before said terminals are pressed into said receiving portions and passageways of said retaining element.

3. The method of claim 1, wherein said exposed ends of said electrically conductive wires are electrically connected at said wire receiving ends of said terminals after said terminals are pressed into said receiving portions and passageways of retaining element.

4. The method of claim 1, wherein said exposed ends of said electrically conductive wires are electrically connected at said wire receiving ends of said terminals via soldering said wire receiving ends of said terminals at respective ones of said exposed ends of said electrically conductive wires.

5. The method of claim 1, wherein said exposed ends of said electrically conductive wires are electrically connected at said wire receiving ends of said terminals via crimping said wire receiving ends of said terminals at respective ones of said exposed ends of said electrically conductive wires.

6. The method of claim 1, wherein the step of molding a unitary connector end at and over said wire-terminal-retainer construction comprises injection molding.

7. The method of claim 1, wherein said attaching structure is configured for attaching the cable at an attachment plate of the camera for the vehicle.

8. The method of claim 1, wherein said connector portion comprises a molded plug or socket element disposed at and partially around exposed pin ends of said terminals.

9. The method of claim 1, wherein the step of pressing said terminals into respective ones of said receiving portions and passageways of said retaining element comprises pressing said terminals so that said pin ends pass through said passageway and protrude from said retaining element and said wire receiving ends are received in said receiving portions of said retaining element.

10. The method of claim 9, wherein said wire receiving end of each of said terminals has a greater diameter than a diameter of said pin end of said terminal.

11. The method of claim 10, wherein each of said receiving portions of said retaining element has a greater diameter than a diameter of the respective passageway of said retaining element.

12. The method of claim 9, wherein, when said terminals are pressed into respective ones of said receiving portions and passageways of said retaining element, said wire receiving ends of said terminals are press-fit in respective ones of said receiving portions of said retaining element.

13. A method of forming a connector for an electrical cable for electrically connecting to a camera of a vehicle, said method comprising:

providing a cable having a plurality of electrically conductive wires, wherein each of said wires is electrically insulated from the others of said wires, and wherein said wires are within an outer sleeve of said cable;

providing a plurality of terminals each having a wire receiving end and a pin end opposite said wire receiving end;

providing a non-electrically conductive retaining element having a plurality of receiving portions and passageways separated by respective walls of said retaining element;

pressing said terminals into respective ones of said receiving portions and passageways of said retaining element, wherein walls of said retaining element electrically isolate said terminals from one another, and wherein said pin ends of said terminals pass through said passageways and protrude from said retaining element when said terminals are pressed into respective ones of said receiving portions and passageways of said retaining element;

after pressing said terminals into respective ones of said receiving portions and passageways of said retaining element, electrically connecting ends of said electrically conductive wires at said wire receiving ends of said terminals, wherein, when said terminals are pressed into respective ones of said receiving portions and passageways of said retaining element and the ends of said electrically conductive wires are electrically connected at said wire receiving ends of said terminals, a wire-terminal-retainer construction is formed at the end of the cable; and placing said wire-terminal-retainer construction in a molding device and molding a non-electrically conductive plastic resin to form a unitary connector end at and over said wire-terminal-retainer construction, wherein said molded unitary connector end comprises (i) a connector portion that is at and partially around exposed portions of said pin ends of said terminals that protrude from said retaining element, and (ii) a sleeve portion that at least partially overlaps said outer sleeve of said cable and seals or bonds at said outer sleeve to seal the molded unitary connector end at said cable.

14. The method of claim 13, wherein said ends of said electrically conductive wires are electrically connected at said wire receiving ends of said terminals via soldering said wire receiving ends of said terminals at respective ones of said ends of said electrically conductive wires.

15. The method of claim 13, wherein said ends of said electrically conductive wires are electrically connected at said wire receiving ends of said terminals via crimping said wire receiving ends of said terminals at respective ones of said ends of said electrically conductive wires.

16. The method of claim 13, wherein the step of pressing said terminals into respective ones of said receiving portions and passageways of said retaining element comprises pressing said terminals so that said pin ends pass through said passageway and protrude from said retaining element and said wire receiving ends are received in said receiving portions of said retaining element.

17. A method of forming a connector for an electrical cable for electrically connecting to a camera of a vehicle, said method comprising:

providing a cable having a plurality of electrically conductive wires, wherein each of said wires is electrically insulated from the others of said wires, and wherein said wires are within an outer sleeve of said cable;

providing a plurality of terminals each having a wire receiving end and a pin end opposite said wire receiving end;

providing a non-electrically conductive retaining element having a plurality of receiving portions and passageways separated by respective walls of said retaining element;

electrically connecting ends of said electrically conductive wires at said wire receiving ends of said terminals;

after electrically connecting ends of said electrically conductive wires at said wire receiving ends of said terminals, pressing said terminals into respective ones of said receiving portions and passageways of said retaining element, wherein walls of said retaining element electrically isolate said terminals from one another, and wherein said pin ends of said terminals pass through said passageways and protrude from said retaining element when said terminals are pressed into respective ones of said receiving portions and passageways of said retaining element, wherein, when said terminals are pressed into respective ones of said receiving portions and passageways of said retaining element and the ends of said electrically conductive wires are electrically connected at said wire receiving ends of said terminals, a wire-terminal-retainer construction is formed at the end of the cable; and placing said wire-terminal-retainer construction in a molding device and molding a non-electrically conductive plastic resin to form a unitary connector end at and over said wire-terminal-retainer construction, wherein said molded unitary connector end comprises (i) a connector portion that is at and partially around exposed portions of said pin ends of said terminals that protrude from said retaining element, and (ii) a sleeve portion that at least partially overlaps said outer sleeve of said cable and seals or bonds at said outer sleeve to seal the molded unitary connector end at said cable.

18. The method of claim 17, wherein said ends of said electrically conductive wires are electrically connected at said wire receiving ends of said terminals via soldering said wire receiving ends of said terminals at respective ones of said ends of said electrically conductive wires.

19. The method of claim 17, wherein said ends of said electrically conductive wires are electrically connected at said wire receiving ends of said terminals via crimping said wire receiving ends of said terminals at respective ones of said ends of said electrically conductive wires.

20. The method of claim 17, wherein the step of pressing said terminals into respective ones of said receiving portions and passageways of said retaining element comprises pressing said terminals so that said pin ends pass through said passageway and protrude from said retaining element and said wire receiving ends are received in said receiving portions of said retaining element.

* * * * *